United States Patent [19]

Neulinger et al.

[11] Patent Number: 4,873,620

[45] Date of Patent: Oct. 10, 1989

[54] VOLTAGE SUPPLY WITH RECOVERY PROTECTION FOR A THYRISTOR

[75] Inventors: Franz Neulinger, Dietzenbach; Helmut Schummer, Heusenstamm; Gerhard Dönig, Erlangen; Walter Schmidt, Uttenreuth, all of Fed. Rep. of Germany

[73] Assignees: Metallgesellschaft AG, Frankfurt am Main; Siemens AG, Munich, both of Fed. Rep. of Germany

[21] Appl. No.: 550,616

[22] Filed: Nov. 10, 1983

[30] Foreign Application Priority Data

Dec. 13, 1982 [DE] Fed. Rep. of Germany ....... 3246057

[51] Int. Cl.[4] .............................................. H02H 7/122

[52] U.S. Cl. ........................................ 363/57; 55/139; 323/903

[58] Field of Search .................. 55/105, 139; 323/903; 363/51, 54, 57, 68

[56] References Cited

U.S. PATENT DOCUMENTS 3,842,337 10/1974 Ekstrom et al. ...................... 363/53
3,881,147 4/1975 Veda et al. ........................... 363/68
4,100,434 7/1978 Iyotani et al. ......................... 363/68
4,233,039 11/1980 Schmidt ............................... 55/139
4,325,114 4/1982 Kobayashi et al. .................. 363/68
4,377,835 3/1983 Asplund et al. ...................... 363/54

FOREIGN PATENT DOCUMENTS 2608436 9/1976 Fed. Rep. of Germany .
3027172 2/1982 Fed. Rep. of Germany .

OTHER PUBLICATIONS

"Elektrofiltersteuerung Mit Direktar Durchbruch-ser-Fassung", Siemens-Zeitschrift; 1971, No. 9; pp. 567-572, 4/5/71.

*Primary Examiner*—Patrick R. Salce
*Assistant Examiner*—Jeffrey Sterrett
*Attorney, Agent, or Firm*—Kenyon & Kenyon

[57] ABSTRACT

A voltage supply for an electric filter is disclosed. The supply comprises a high-voltage rectifier, a pulsed voltage circuit including a resonant circuit and a parallel circuit of a thyristor and a diode which controls resonance in the resonant circuit. The thyristor is fired to trigger the resonant circuit and generate an oscillation which is delivered to the filter as a pulsed voltage. In order to prevent damage to the thyristor, it is fired whenever the duration of the current flowing through the diode is shorter than the thyristor recovery time.

9 Claims, 2 Drawing Sheets

VOLTAGE SUPPLY WITH RECOVERY PROTECTION FOR A THYRISTOR

BACKGROUND OF THE INVENTION

The present invention relates to a voltage supply for an electric filter.

Electric filters usually operate with a high dc voltage obtained by rectification of a voltage supplied by an ac network (see, for example, "Siemens-Zeitschrift," 1971, No. 9, pages 567 to 572). It is known to superimpose on this high dc voltage supplied to the filter a pulsed voltage which is dependent on the operating state of the filter and can be generated, for example, in response to a short circuit in the filter, as disclosed for example in DE-OS 26 08 436 and DE-OS 30 27 172.

Pulsed voltage sources for providing the pulsed voltage are also known, according to which a thyristor and a diode are connected in series with a dc voltage source and a transformer coupled to the filter. The resonant circuit formed by the transformer and the pulsed voltage source is triggered each time the thyristor is fired, as described for example in DE-OS 26 08 436, to provide an oscillation of the resonant circuit which is delivered to the filter as a pulsed voltage via the transformer.

A breakdown of the electric filter resulting in a short circuit usually occurs at the time that the maximum voltage is applied to the filter, i.e. during the period the diode carries the pulsed current (oscillation), or shortly thereafter. Due to the filter short circuit, the resonant circuit oscillation is abruptly damped, i.e. the diode is blocked. Thereby, the maximum dc voltage is reapplied to the thyristor. If the time between cut-off of the thyristor by the zero crossing of the current and transfer of current through the diode is very short, i.e. shorter than the recovery time of the thyristor, the thyristor can be fired by the reapplied maximum dc voltage without a firing pulse. Since this firing of the thyristor proceeds relatively slowly, the thyristor is subjected to high thermal stress during this period and may be destroyed.

OBJECT AND SUMMARY OF THE INVENTION

It is an object of the present invention to protect the thyristor or a series and/or parallel circuit of thyristors in a filter voltage supply of the type described above in the event of a breakdown or short circuit in the electric filter.

This and other objects are achieved in accordance with the invention by supplying a firing pulse to the thyristor(s) if the duration of the current flowing through the diode is shorter than the recovery time of the thyristor(s) and preventing subsequent firing pulses from firing the thyristor for a period of time depending on the state of the filter. The invention thereby limits thermal stress in the thyristor(s).

Further in accordance with the invention, a signal is generated which is proportional to the duration of the current flow in the diode and is compared to a predetermined signal proportional to the recovery time of the thyristor(s) to determine if the length of time that current is flowing through the diode is shorter than the recovery time of the thyristor(s). The result of the comparison is used to control the circuit supplying the firing pulses to the thyristor(s).

According to a preferred embodiment, a square wave voltage proportional in frequency to the diode current is generated and compared with the output of a multivibrator trigged by the square wave. The multivibrator in response to being triggered supplies an output pulse having a width or duration corresponding to the recovery time of the thyristor. A logic circuit effects the comparison and the result of the comparison is stored in a memory device which controls the circuit supplying the firing pulses.

In accordance with another aspect of the invention in which a controller controls the high-voltage rectifier in response to filter flashovers, the circuit supplying the firing pulses is further controlled by the controller. According to the preferred embodiment described above, the memory device can be set by the controller.

In accordance with still another aspect of the invention, the number of thyristor firing pulses supplied to the thyristor in a given time period is selected and used to control the period and/or amplitude of the pulsed voltage delivered to the filter and/or the magnitude of the high dc voltage delivered to the filter.

The above and other objects, features, aspects and advantages of the present invention will be more readily perceived from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like numerals indicate similar parts and in which.

DESCRIPTION OF THE PREFERRED EMBODIMENTS

Figure 1:
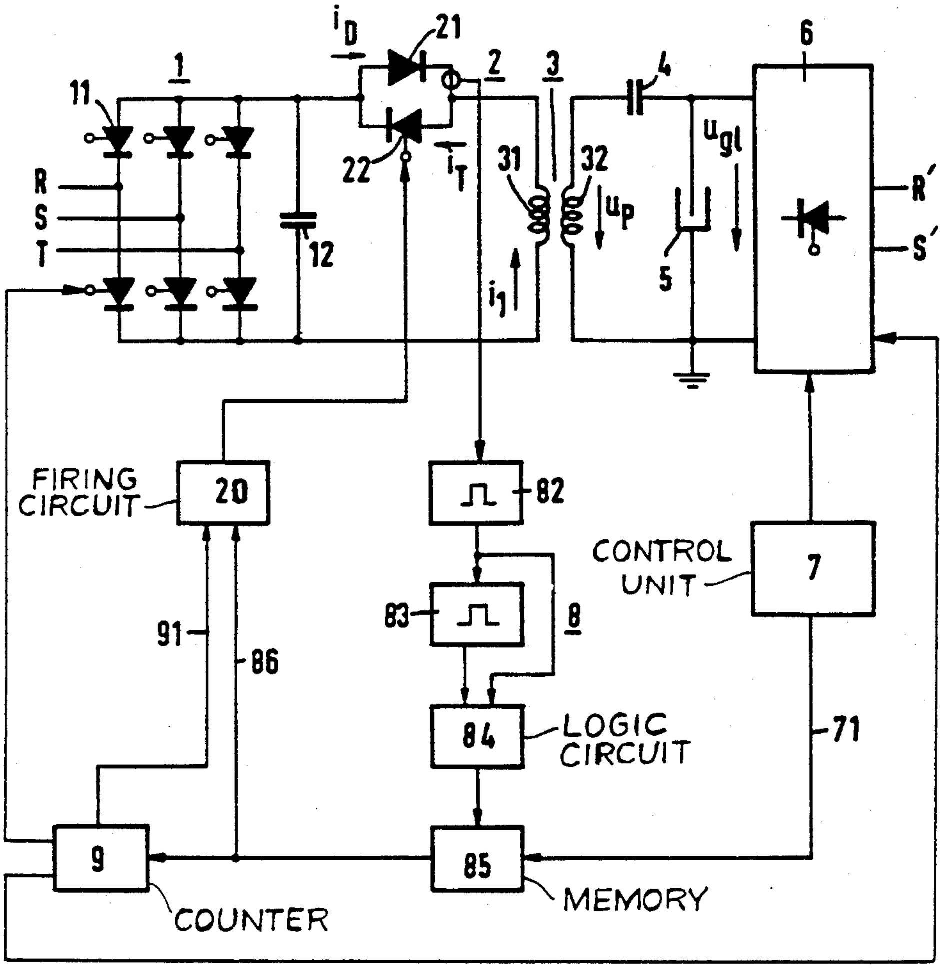
FIG. 1 is a block diagram of a voltage supply for an electric filter according to the invention.

An electric filter designated 5 in FIG. 1 is supplied in a manner known per se from a high-voltage rectifier 6 which is connected to ac network lines R′, S′. Control apparatus 7 is coupled to the rectifier 6 and controls the high dc voltage supplied to the electric filter 5 in response to breakdowns, e.g. short circuits, overcurrent, etc., and is described in detail in the above-mentioned publication "Siemens-Zeitschrift". The control apparatus is not part of the invention disclosed herein and is therefore not described in detail.

Also connected to the electric filter 5 is a pulsed voltage source comprised of a rectifier 1 which may include controlled semiconductor devices 11, a storage capacitor 12 connected in parallel with the rectifier 1, a circuit arrangement 2 connected in series with rectifier 1 comprised of parallel-connected thyristor 22 and diode 21, and a pulse transformer 3 having a primary winding 31 and a secondary winding 32. The recitifier 1 is supplied from lines R,S,T of a three-phase network and with capacitor 12 provides a dc voltage to the thyristor and diode. The pulsed voltage $U_p$ at the secondary winding 32 is fed to the electric filter 5 via a coupling capacitor 4 and is applied to the filter 5 together with the high dc voltage $U_{gl}$ from the high-voltage rectifier 6.

Figure 2:
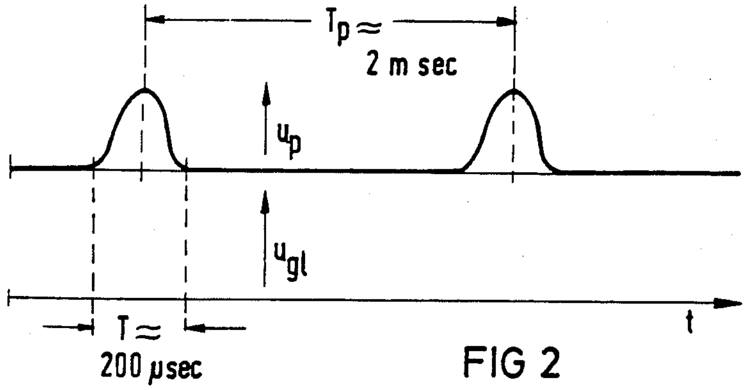
FIG. 2 is a waveform diagram showing the voltage at the transformer of the voltage supply of FIG. 1 during normal filter operation.
Figure 3:
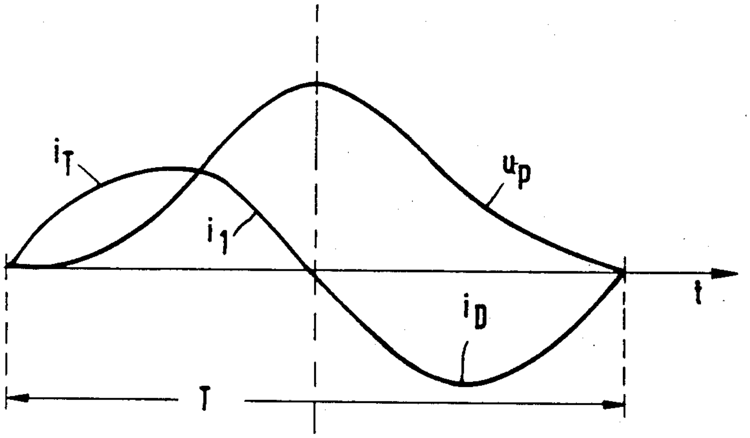
FIG. 3 is an enlarged waveform diagram showing the pulsed current at the primary of the transformer and the pulsed voltage at the secondary of the transformer of the voltage supply of FIG. 1.

A firing circuit 20 supplies firing pulses to the thyristor 22, for example, at a periodic intervals $T_P$ (FIG. 2) of 2 ms. The firing pulses trigger the series resonant circuit formed by components of the pulsed voltage source, i.e. capacitor 12, the transformer primary winding 31, the transformer secondary winding 32 and the coupling capacitor 4, and the electric filter 5. Primary current designated $i_1$ in FIGS. 1 and 3 flows through the primary winding 31 and induces a pulsed voltage designated $U_p$ in the secondary winding 32. The superposition of the pulsed voltage $U_P$ and the high dc voltage $U_{gl}$ results in the voltage waveform applied to the electric filter shown in FIG. 2, the individual pulses having a width of, for example, 200 us. Upon firing the thyristor 22 to trigger a one period oscillation in the resonant circuit during normal filter operation, thyristor 22 initially carries the current designated $i_T$ until the zero crossing point of the current, at which time diode 21 conducts the current designated $i_D$. The oscillation currents $i_T$ and $i_D$ compose the primary current $i_1$ at the transformer primary 31. When the diode current $i_D$ again passes through zero, oscillation of the resonant circuit is terminated until the resonant circuit is triggered by another firing pulse supplied to the thyristor 22.

Figure 4:
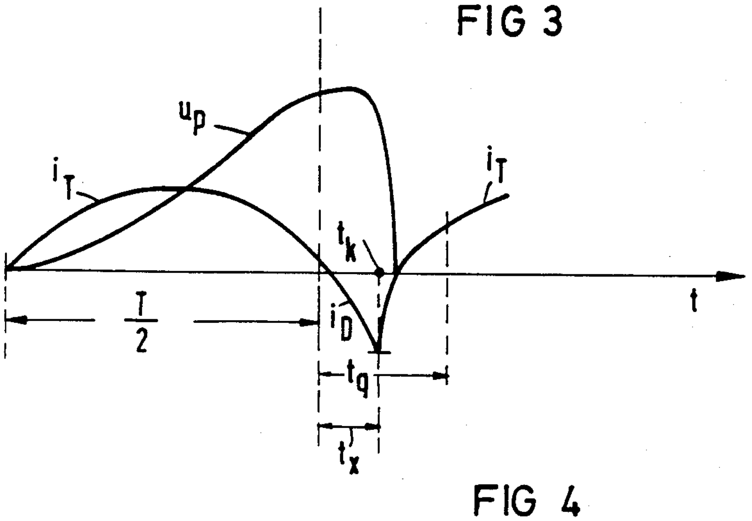
FIG. 4 is an enlarged waveform diagram showing the voltage and current relationships of FIG. 3 during breakdown of the filter.

FIG. 4 illustrates the voltage and current relationships when a short circuit occurs in the filter 5. The secondary winding voltage $U_P$ breaks down at time $t_k$ due to a flashover and drops to zero. The flashover also causes the diode to block so that the diode current $i_D$ likewise goes to zero, and the resonant circuit oscillation is terminated. As a result, the full dc voltage is abruptly applied across the thyristor 22. If the time during which the diode current flows through diode 21 is longer than the recovery time of the thyristor 22, the thyristor will not fire and there is no problem. However, if the time $t_x$ in which the diode current $i_D$ goes to zero is shorter than the required recovery time $t_q$ of the thyristor 22, the thyristor 22 will fire without a firing pulse. Since this process takes a relatively long time, the thyristor can be thermally overloaded. According to the invention, the period $t_x$ in which the diode current $i_D$ flows, i.e., the second half-wave of the primary current, is monitored. If this time $t_x$ is shorter than the recovery time $t_q$ of the thyristor, then the thyristor is immediately fired by a firing pulse so that it can again conduct current. Since the dc voltage at the electric filter is reduced to zero due to the short circuit, this additional voltage firing pulse has no major effect on filter operation.

Referring to FIG. 1, the diode current $i_D$ is measured, as indicated by the circular connection, and supplied to a multivibrator 82 which generates a square wave having a pulse width or half cycle $t_x$ which corresponds to the spacing of the zero crossings of the current $i_D$. Thus, the multivibrator 82 provides a square wave having a frequency proportional to the duration of the current pulses in the diode. The square wave signal is fed to and triggers a monostable multivibrator 83 which produces a pulse having a width corresponding approximately to the recovery time $t_q$ of the thyristor 22. The output of the multivibrator 82 and the output of the multivibrator 83 are connected to a logic circuit 84, in which a comparison is made as to whether the signal from the multivibrator 82 corresponding to the duration of the current pulses $t_x$ is larger or smaller than the recovery time $t_q$ set in the monostable multivibrator 83. If the pulse width of the output signal of the monostable multivibrator 83 is wider than the square wave pulse width output signal of multivibrator 82, i.e. if the duration $t_x$ between the zero crossings of the diode current is shorter than the recovery time $t_q$, the logic circuit 84 responds and delivers a setting signal to a memory device 85. The memory device transmits an immediate command via line 86 to the firing circuit 20 to fire the thyristor 22, and then disables the firing circuit 20 for a time dependent on operating data of the filter. The firing circuit 20 can again be enabled, for example, when the dc voltage at the filter reaches a given magnitude. This can be accomplished by having the controller 7 reset the memory 85 to enable the firing circuit 20.

The number of additional firing pulses so generated per unit time can be determined by counting them in a counter 9 and the count used to optionally change the pulse firing frequency, as indicated by the line 91. Alternatively, it is also possible to vary the amplitude of the oscillation pulses by controlling the rectifier 1 and/or the magnitude. of the dc voltage by controlling the high voltage rectifier 6.

Certain changes and modifications of the embodiments of the invention disclosed herein will be readily apparent to those skilled in the art. It is the applicants' intention to cover by their claims all those changes and modifications which could be made to the embodiments of the invention herein chosen for the purpose of disclosure without departing from the spirit and scope of the invention.

What is claimed is:

1. In a voltage supply for an electric filter in which the electric filter is supplied with a high dc voltage from a first source of dc voltage, the supply including a transformer having a primary winding and a secondary winding, the secondary winding being coupled to the electric filter, a parallel connection of a thyristor and a diode connected in series with the primary winding and a second source of dc voltage, and a circuit coupled to the thyristor to supply periodic pulses thereto to periodically fire the thyristor and thereby trigger a resonant circuit which includes the transformer to produce a one period oscillation in the resonant circuit which is coupled to the filter by the transformer secondary winding, the improvement wherein the firing circuit comprises means for generating a firing pulse and supplying it to the thyristor when the duration of the current resulting from the one period oscillation flowing through the diode is shorter than the recovery time of the thyristor and means for preventing delivery of subsequent firing pulses from the firing circuit to the thyristor for a period of time depending on the state of the filter.

2. The improvement according to claim 1 wherein the means for generating comprises a first means for generating a first signal proportional to the duration of current oscillation in the diode and second means for comparing the first signal with a second signal proportional to the recovery time of the thyristor, the means for preventing including means operatively connected to the comparing means and to the firing circuit for disabling the firing circuit in response to a signal from the comparing means when the first signal is less than the second signal.

3. The improvement according to claim 2 wherein the first means generates a square wave having a square wave pulse width proportional to the duration of the current oscillations in the diode, wherein the second means is a logic circuit and wherein the means for disabling comprises a memory device whose output is operative to disable the firing circuit.

4. The improvement according to claim 3 wherein the first means is a multivibrator.

5. The improvement according to claim 3 further comprising a monostable multivibrator having a period corresponding to the recovery time of the thyristor coupled to and triggered by the first means to provide the second signal.

6. The improvement according to claim 3 wherein the memory device can be reset by a signal from a controller which controls a rectifier included in the first source of dc voltage.

7. The improvement according to claim 1 including means for determining the number of firing pulses generated by the means for generating in a given time, the determining means being operatively coupled to the first source of dc voltage for controlling the magnitude of the high dc voltage supplied to the electric filter.

8. The improvement according to claim 1 including means for determining the number of firing pulses generated by the means for generating in a given time, the determining means being operatively coupled to the second source of dc voltage for controlling the amplitude of oscillation pulses in the resonant circuit.

9. The improvement according to claim 1 including means for determining the number of firing pulses generated by the means for generating in a given time, the determining means being operatively coupled to the firing circuit for controlling the pulse firing frequency of the firing circuit.

* * * * *